United States Patent
Therasse et al.

Patent Number: 5,414,705
Date of Patent: May 9, 1995

[54] RESEQUENCING DEVICE FOR A NODE OF A CELL SWITCHING SYSTEM

[75] Inventors: Yves Therasse, Chastre; Pierre-Paul F. M. M. Guebels, Keerbergen, both of Belgium

[73] Assignee: Alcatel N.V., Amsterdam, Netherlands

[21] Appl. No.: 152,452

[22] Filed: Nov. 12, 1993

[30] Foreign Application Priority Data

Nov. 30, 1992 [EP] European Pat. Off. ............ 92203695

[51] Int. Cl.⁶ .......................................... H04L 12/56
[52] U.S. Cl. .................................... 370/60.1; 370/61; 370/94.1
[58] Field of Search ................ 370/60, 60.1, 61, 79, 370/82, 94.1, 94.2, 108

[56] References Cited

U.S. PATENT DOCUMENTS

| | | | |
|---|---|---|---|
| 5,127,000 | 6/1992 | Henrion | 370/60 |
| 5,214,639 | 5/1993 | Henrion | 370/60 |
| 5,237,564 | 8/1993 | Lespagnol et al. | 370/60.1 |
| 5,278,825 | 1/1994 | Wallmeier et al. | 370/61 X |
| 5,297,140 | 3/1994 | Boyer et al. | 370/61 |

FOREIGN PATENT DOCUMENTS

| | | |
|---|---|---|
| 9102419 | 2/1991 | WIPO |
| 9102420 | 2/1991 | WIPO |
| 9108633 | 6/1991 | WIPO |

*Primary Examiner*—Melvin Marcelo
*Attorney, Agent, or Firm*—Ware, Fressola, Van Der Sluys & Adolphson

[57] ABSTRACT

The application is for telecommunication networks of asynchronous transfer mode. The device contains a time stamp generator (TSG) for assigning a time stamp to each cell; a buffer memory (BM); an address memory (FSAM) for memorizing the address of the first sub-cell of each cell; a link memory (LM); and a circuit for indicating the address of the buffer memory that contains the first sub-cell of a cell. This circuit contains in particular: a memory that is accessible by its content, for memorizing a cell identifier (TSTP-OA; TSTP-OM) when a cell is made to wait, where each identifier indicates a time period during which the waiting delay expires, and at least one output from which the cell must be emitted; and a marker memory for each output, where a marker is recorded as soon as a cell is made to wait, to locate the time period during which the waiting delay of this cell will expire; the markers are read starting with the oldest, and only those that correspond to expired delays are validated when the output in question indicates that it is available; and each marker is potentially common to several cells.

3 Claims, 5 Drawing Sheets

RESEQUENCING DEVICE FOR A NODE OF A CELL SWITCHING SYSTEM

CROSS-REFERENCE TO RELATED APPLICATION

This application discloses subject matter that is disclosed and may be claimed in copending application U.S. Ser. No. 08/152,594 filed on even date herewith and that claims priority from EPO Application 92203694.2, filed Nov. 30, 1992.

1. Technical Field

The invention concerns a resequencing device for a node of a cell switching system. More particularly, it concerns switching systems in which the cells are of variable length, where each cell can have a number of sub-cells of a fixed length.

2. Background of the Invention

Each time these cells pass through a node of a switching system, each is subjected to a variable delay as a function of the path followed in the switching network that contains this node. The sub-cells of a same cell are linked so that they follow the same path and undergo the same delay. The sub-cells of a same cell therefore maintain their initial order at the output of the switching network; by contrast, the cells do not always maintain their initial order because of the scattering of the delays. A resequencing device has the function of resetting these cells into their initial order.

The European Patent Application No. 0,438,415, corresponding to International Publication No. WO 91/02419 and U.S. Pat. No. 5,127,000, describes a resequencing process that consists in delaying each cell by a determined delay so that the total delay imposed by the switching network and by the resequencing device provides a perceptibly constant value to all of the cells, where this value is generally selected to be larger than the maximum delay the switching network can produce. If the total delay is chosen to be less than the maximum delay value that the switching network can produce, the probability of disturbing the initial order is not zero, it is a function of the value chosen for the total delay. This known process encompasses two variations.

A first variation consists in: assigning a time stamp to each cell that enters the switching network, which indicates at what moment the cell penetrated into the switching network; to extract the time stamp from each cell leaving the switching network; to store each cell leaving the network until the time indicated by the time stamp generator equals the time indicated by the time stamp of the cell, plus the selected total delay; then permitting the cell to be emitted from an outlet of the resequencing device. The emission actually takes place as soon as the outlet, for which the cell is intended, becomes available.

According to this variation, the initial order of the cells is restored without having to measure or to estimate the delayed transition of each cell through the switching network. On the other hand, the time supplied by the time stamp generator must be available in a device located at the input of the network for the assignment of time stamps, and must be available at the same time in a resequencing device located at the output of the network, to authorize each cell to be emitted at an appropriate moment.

According to another variation of this known process, each cell that leaves the network is assigned a label whose value is an estimate of the delay undergone by the cell during its passage through the network; and to subject each cell to an additional delay of a duration that is equal to the difference between the predetermined value of the total delay and the estimated value of the delayed passage through the network, which is read from the label assigned to each cell. This variation has the advantage of not needing a device that assigns time stamps to the cells that arrive at the inputs of the switching network.

This patent application also describes a resequencing device that uses the first variation of the process mentioned above, for cells consisting of a variable number of sub-cells, each having a fixed length. Each output of a node is equipped with one of these devices. This device includes:

- a generator of first time stamps, which supplies a value incremented by one unit for each time interval corresponding to one sub-cell, with a cycle period at least equal to the total predetermined delay, to uniformly delay all the cells;
- a buffer memory with one input coupled to an input of the resequencing device, and with an output coupled to an output of the resequencing device; each site of this memory has a capacity of one sub-cell;
- a management circuit for this buffer memory, to supply the addresses of free sites in this buffer memory, and for respectively storing therein the sub-cells of each cell received by the resequencing device;
- a read/write pointer associated with the buffer memory;
- a memory of addresses containing the sites that correspond respectively to the various possible time stamp values; each site of this address memory stores a starting and an ending pointer of the list which are the respective addresses, in the buffer memory, of the first and the last sub-cell of a chain containing all the cells with the same time stamp;
- a link memory with the same addresses as the buffer memory, to memorize the links between the addresses of all the sub-cells with the same time stamp, and to memorize the links between the addresses of the sub-cells that belong to the cells scheduled to be emitted successively;
- a write pointer associated with this address memory to store in each site the first and the last address of a list of site addresses of the buffer memory, which contains all the sub-cells of all the cells having the same time stamp;
- a read pointer associated with the address memory, having a cyclic function, to successively read the contents of the sites in this address memory, in order to read sub-cells in the buffer memory to addresses corresponding to time stamps that cross regularly.

When the delay of a chain of cells with a given time stamp expires, meaning when the time indicated by the stamp generator is equal to the sum of the given time stamp and the predetermined total delay, the first and the last storage address of this chain are read in the site of the address memory corresponding to this time stamp. The link memory then supplies the complete chain of addresses and permits therefore to read all the sub-cells of all the cells having the time stamp under consideration, in the buffer memory. These cells are read in the order defined by the links in the link memory, but this order is not important because all these cells have the same time stamp and are addressed to the same output. In addition, the link memory is used to interlink in the same waiting line, the different chain of sub-cells from cells with successive time stamps, which ensures their emission in the proper order. This interlinkage is made by letting the link memory make the end of the chain of sub-cell addresses of one cell, correspond to the start of the chain of sub-cell addresses of the cell to be emitted next.

This device has a first inconvenience, which is that it cannot reset the order of cells arriving at the same input, which are intended for several outputs, particularly when the same cell must be distributed to several outputs. This inability results from the function principle of this known device, because it requires storing in each site a starting address of the address chain and an ending address of the sub-cell address chain; and it requires a link memory to chain all the sub-cells that will subsequently be emitted from the same output.

This known device has a second inconvenience, which is not to allow the distribution of a cell to several outputs.

This known device has furthermore the inconvenience of not allowing long cell lengths. Each site of the address memory corresponds to a unit of time of the generator that delivers the time stamps. This unit of time is equal to the duration of one sub-cell. The time stamp generator does not have an infinite capacity. It therefore delivers identical stamp values, periodically. Each site of the address memory is read with a constant period, at most equal to the period of the time stamp generator. At the moment a site is read, the make-up of the list must be terminated, so that an address from the end of the list can be properly read in the site being considered. The time stamp generator period therefore limits the number of sub-cells corresponding to the list, and finally limits the number of sub-cells each cell can contain.

Furthermore, it is not possible to indefinitely increase the period of the time stamp generator, because that requires increasing the number of bits assigned to each cell to constitute a time stamp.

DISCLOSURE OF INVENTION

The first goal of the invention is to propose a resequencing device that allows to distribute a cell from one input to several predetermined outputs of the resequencing device. The second goal of the invention is to propose a resequencing device that is easier to adapt so that it accepts cells composed of a large number of sub-cells.

The objective of the invention is a resequencing device for a node of a cell switching network, where each cell consists of a variable number of sub-cells having a fixed length, where the node includes a switching network that transmits cells with variable first delays, and all the sub-cells of the same cell undergo the same first delay; where this resequencing device contains means for storing all the cells that have been transmitted through the switching network, then emit them from at least one output of the resequencing device, after the expiration of several waiting delays that constitute second delays such as, for each cell, the sum of the first and the second delay that equals a predetermined value that is perceptibly identical for all the cells; where these means include:

a buffer memory for storing the sub-cells of each cell received by the resequencing device;

an address memory for memorizing the address of the buffer memory that contains the first sub-cell of each cell;

means to find the address again in the address memory that contains the first sub-cell of a cell, when its waiting delay has expired, and an output is available to emit this cell;

characterized in that the means to find the address of the buffer memory that contains the first sub-cell of a cell, comprise:

a so-called waiting cell memory, which is accessible by its content, to memorize a so-called waiting cell identifier when a cell is stored in the buffer memory; this identifier is stored in an address that is identical to the address where the first sub-cell is stored in the address memory; and this identifier is composed of: the identity of a time period during which the waiting delay of that cell expires, and the identity of at least one output from which it must be emitted;

so-called marker memories, which are associated with the respective node outputs, for memorizing a marker when a cell is stored in the buffer memory, where each memorized marker identifies a period of time during which the waiting delay of at least one cell expires, which cell is intended for the output associated with the marker memory being considered;

means respectively associated with the marker memories, for reading and deleting the oldest marker among those that correspond to waiting delays having expired, when the corresponding output becomes available; and to furnish an identifier of a cell to be emitted, composed of the identity of the time period and the identity of the output that corresponds to this read marker;

means to apply this identifier of a cell to be emitted to a comparison input of the waiting cell memory, where this memory then supplies the addresses of all the waiting cell identifiers that correspond to this cell identifier to be emitted; and to free the sites of this memory that correspond to the cells that must not be emitted;

means to successively apply to an input of the first sub-cells memory, each address supplied by the waiting cell memory, and to read to it a first sub-cell address.

The device characterized in this manner is compatible with a distribution because it is associated with all the outputs of a node, and because the waiting cell memory stores identifiers, each of which can contain several identities of intended outputs.

In addition, it is easier to realize for long length cells, because the identifier of a waiting cell can be memorized in this memory without waiting for all the sub-cells of this cell to have actually been received by the node. The first sub-cells of a cell can therefore be emitted from an output, even before the last sub-cells have been received.

One configuration mode of the device of the invention is characterized in that the marker memories contain a chain of registers for each output; each register is capable of memorizing a single marker, and the number of registers is equal to the number of identities that can be used to identify time periods;

in that the means to inscribe a marker containing means to validate, in writing, the register corresponding to the time period during which the waiting delay of a cell will expire, as a function of the identifier of that cell;

and in that the means to read and delete a marker containing for each output:

means to read the markers that correspond to the oldest time periods;

means linked to all the registers, for supplying an identifier of a cell to be emitted, composed of: the identity of the oldest time period among those corresponding to the read markers; and the identity of said output;

means to delete the marker corresponding to the oldest time period, among the read markers, when all the cells corresponding to this identifier of a cell to be emitted have been found in the waiting cell memory.

One configuration mode that allows to distribute one cell from one input to several outputs of the resequencing device, is characterized in that:

for each cell to be emitted from several outputs, a waiting cell identifier identifies each of the outputs from which it must be emitted;

each identifier of a cell to be emitted identifies a single available output;

and in that it furthermore contains means for:

successively finding in the waiting cell memory, each waiting cell identifier that contains the identity of the available output identified by the identifier of the cell to be emitted;

to read to this memory each waiting cell identifier thus found again;

to emit the corresponding cell from said output;

to reinscribe this identifier to the same address in the waiting cell memory, after having suppressed in this identifier the identity of the output from which the cell was emitted, in order to update this waiting cell identifier.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
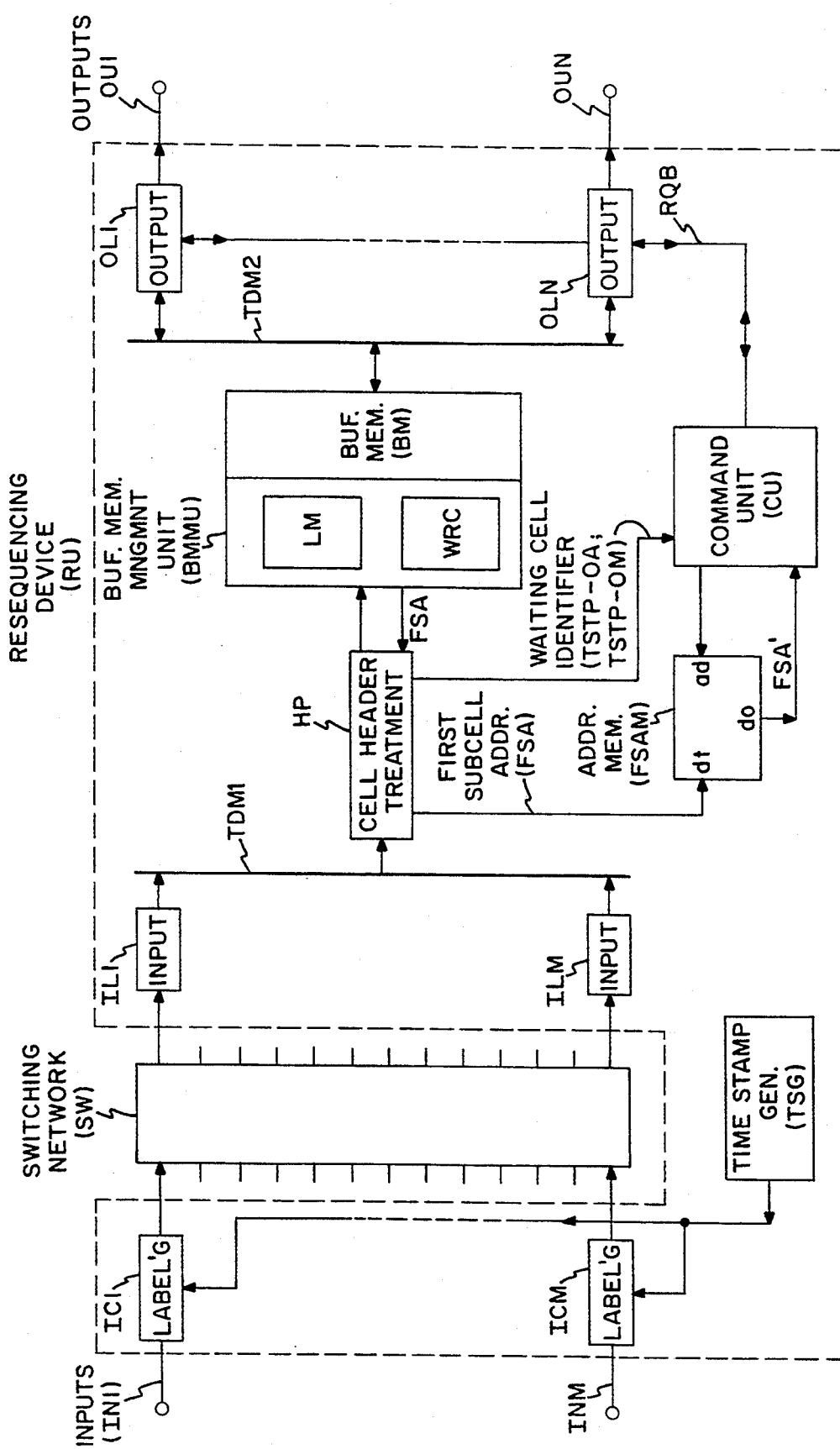
FIG. 1 is the synoptic joint diagram of a first and a second configuration example of the device according to the invention, linked to a switching network to form a node of a cell switching system.

FIG. 1 represents a node of a telecommunications network with asynchronous transfer mode, which contains a switching network SW and a configuration example RU, of the resequencing device according to the invention. This node contains M inputs IN1, ... ,INM, and N outputs OU1, ... ,OUN. This configuration example of the resequencing device RU comprises:

M labeling circuits IC1, ... ,ICM, each having: one input linked respectively to one input IN1, ... ,INM of the node, one output linked respectively to one of N inputs of the switching network SW, and one common input;

M input circuits IL1, ... ,ILM, each having: one input linked respectively to one of M outputs of the switching network SW, and one output linked to a time multiplexing bus TDM1;

one cell header treatment circuit HP, with a first input linked to the bus TDM1;

one command unit CU which will be detailed later and which contains a first input linked respectively to a first output of the header treatment circuit HP;

a time stamp generator TSG, with one output linked to the common input of the labeling circuits IC1, ... ,ICM; this generator is composed of a clock and a counter, not illustrated, to supply a time stamp value which is incremented by one unit for each time period corresponding to a sub-cell, from 0 to TSTPmax, TSTPmax module;

a buffer memory BM associated with a buffer memory management unit BMMU, this assembly having: one input linked to a second output of header treatment circuit HP, one output linked to a second input of circuit HP, and one input-output linked to a time multiplexing bus TDM2;

a memory FSAM called address memory, having: one data input 'di' linked to a third output of the circuit HP, one address input 'ad' linked to an output of the unit CU, and one output 'do' linked to a second input of unit CU;

N output circuits OL1, ... ,OLN, each having: one input-output linked to the bus TDM2, one output linked respectively to one of the node outputs OU1, ... ,OUN, and one input-output linked to a bus RQB, which itself is linked to an input-output of the command unit CU.

The inputs IN1, ... ,INM receive fixed or variable length cells, each formed of sub-cells, all having the same number of bits and the same duration, where this duration is called the sub-cell period. The device according to the invention is especially suitable for treating variable length cells. These cells are switched in the switching network SW by routing all sub-cells of the same cell through the same path and maintaining the continuity of the cell, which means without interlacing sub-cells that belong to different cells. This permits to assign a unique time stamp to all the sub-cells that form a cell. This time stamp indicates the time period during which the first sub-cell of the cell in question is received by one of the inputs IN1, ... ,INM.

This label allows to resequence the cells leaving the switching network SW: the first sub-cell is authorized to leave the node when its waiting delay has expired, which means during the time period when the generator TSG indicates a time equal to the sum of the time stamp value that was assigned to the cell, and a fixed value. But there is an additional condition for the cell to be emitted: the output to which this cell is intended, must be available. Otherwise the cell in question must still wait until this output becomes available.

Each sub-cell begins with two bits called the sub-cell control field. In the first sub-cell of each cell, these two bits have a value of 11, for example. In all other sub-cells, except the last one, these two bits have a value of 00, for example. For example in the last sub-cell, these two bits have a value of 01. The first sub-cell contains furthermore a field called cell control header. This field contains in particular the identity of the output that must emit this cell, or that of several outputs in case of a diffusion. The other sub-cell bits transmit data.

The labelers IC1, . . . ,ICN have the function of inserting, in each cell's control field, a time stamp supplied by the generator TSG, at the instant when the first sub-cell of this cell is received by the node. This time stamp TSTP indicates the time period during which the waiting delay of the cell will expire. It is determined as a function of the counter TSG at the instant when this cell arrives, and as a function of the total predetermined delay which each cell must undergo. In a preferred configuration, the TSTPmax module of the counter is chosen to be equal to this predetermined total delay, therefore the value of the time stamp TSTP is numerically equal to the value supplied by the counter, because of the TSTPmax module.

When one of the input circuits IL1, . . . ,ILM receives a cell, it requests the management unit BMMU to supply free addresses for respectively storing the sub-cells of this cell in the buffer memory BM. In order to optimize the buffer memory BM utilization, the sub-cells of a cell are not stored in consecutive addresses, but in random addresses. The management unit BMMU contains in particular a reading and writing command circuit WRC, which stores the free addresses of the buffer memory BM in the measure they are freed by the emission of cells, and contains a linking memory SLM that stores all the addresses of the sites of the buffer memory BM, respectively storing all the sub-cells of the same cell. The capacity of each buffer memory site is equal to one sub-cell.

The configuration of the buffer memory BM and the management unit BMMU is left to the specialist, since it is described in particular in the European patent application EP 0,441,787, corresponding to International Publication WO 91/02420 and to U.S. Pat. No. 5,214,639. The buffer memory BM and the linking memory SLM have preferably the same set of addresses, to make the configuration easier.

The request from one of the input circuits IL1, . . . ,ILM is transmitted by the bus TDM1, then by the header treatment circuit HP, to the management unit BMMU. The latter assigns a chain of free sites in the buffer memory BM to the sub-cells of the cell in question. The circuit WRC furnishes a chain of addresses designating these free sites. Links between the addresses of this chain are formed by memorizing this chain of addresses in consecutive addresses of the linking memory SLM. The management unit BMMU supplies a value FSA to the header treatment circuit HP, which is the first of this chain of address sites in the buffer memory BM. The address FSA is retransmitted to the third output of circuit HP. This address FSA is written into the address memory FSAM in a free site, whose address is supplied by the output of unit CU.

This address FSA will ultimately allow to find all the sub-cells of this cell in the buffer memory BM: by using this address FSA, it is possible to read, in the linking memory SLM, the address of a second sub-cell in the buffer memory BM. With this second sub-cell address it is then possible to read the address of a third sub-cell from the buffer memory BM to the linking memory SLM. It is therefore possible to obtain the addresses of all the sub-cells of the same cell in sequence, starting with a unique address FSA. These addresses then allow reading the sub-cells themselves in the buffer memory BM.

Circuit HP extracts the field containing the time stamp TSTP from the cell control field of the first sub-cell of each received cell, and a field containing the identity of the output, or the outputs, OU1, . . . ,OUN, from which the cell must be emitted.

The first configuration example, described further on, is only suitable in the event a cell is only intended for a single output. The identity of the single output intended to emit a cell is designated OA. Simultaneously the circuit HP supplies to the command unit CU: the time stamp TSTP, the output identity OA, and the first sub-cell address FSA. The second configuration example is suitable in the event one cell is intended for several outputs, the identity of these outputs is designated OM. For a device with N outputs, this identity OM may be a word of N bits, where the value 1 is assigned to the bits that correspond to the outputs for which the cell is intended. The other bits are assigned the value 0.

The treatment of these data by the unit CU will be described in detail further on, by distinguishing two configuration variations respectively corresponding to the first and the second configuration example of the device according to the invention.

The function of the command unit CU is triggered by the output circuits OL1, . . . ,OLN, when one of these output circuits is available to emit a cell, in other words when it has finished emitting a cell. It sends a message designated IDL via the bus RQB, which contains the identity of the available output and is directed to the command unit CU. The command unit CU then determines which cell will be emitted from that output. The unit CU sends the address FSA' of a site in the buffer memory BM, which contains the first sub-cell of a cell, to the requesting output circuit. The output circuit then requests the buffer memory BM and its management unit BMMU to supply the complete chain of sub-cells from this cell. They are then emitted from its output.

Figure 2:
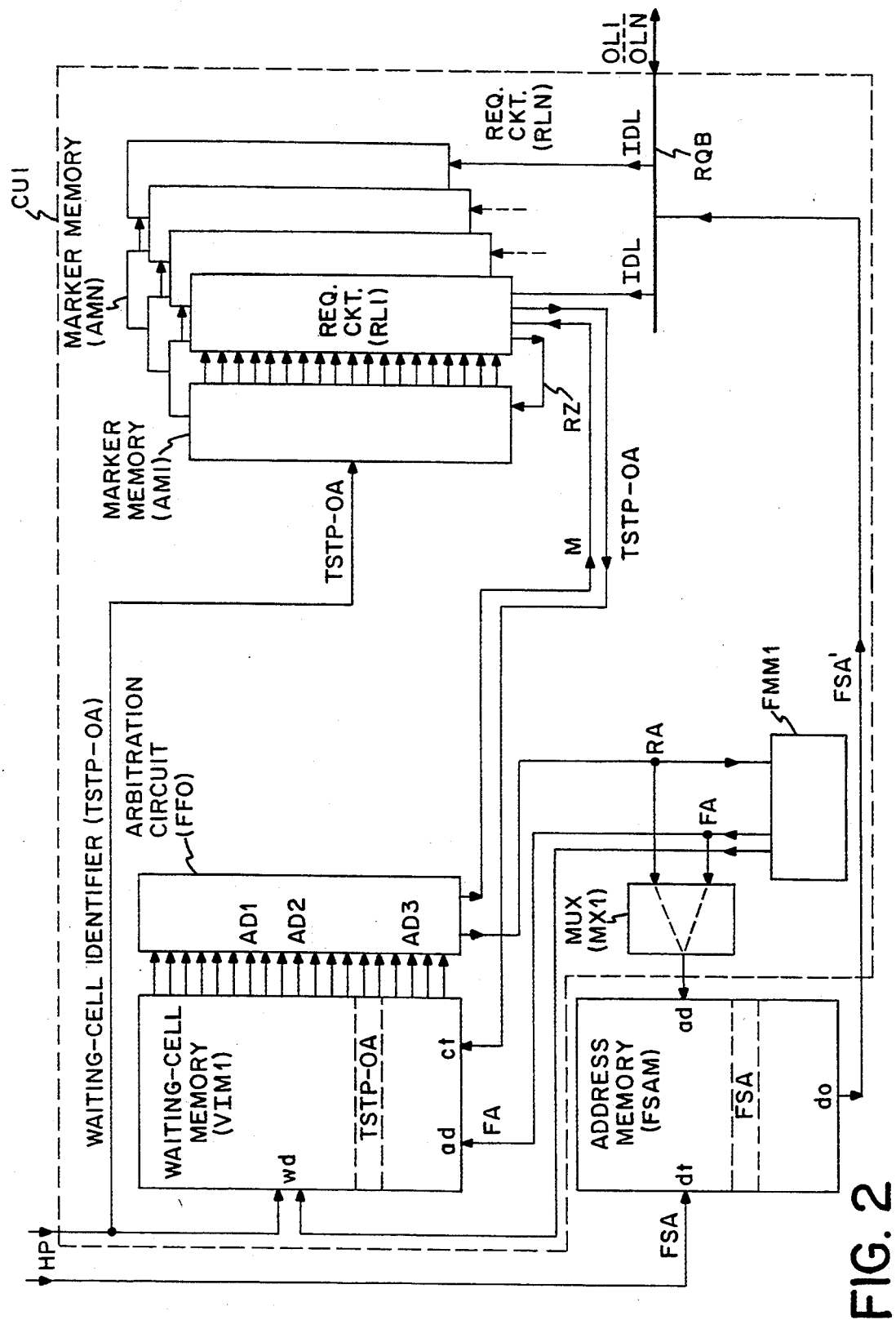
FIG. 2 represents a more detailed synoptic diagram of the first configuration example, which is only suitable for cells intended for a single output.

FIG. 2 represents the synoptic diagram of the command unit CU1 of the first configuration example of the resequencing device according to the invention, which can only route a cell to a single output among the N outputs OU1, . . . ,OUN. The unit CU1 essentially contains:

- a waiting cell memory VIM1, of the type accessible by content, which has the same set of addresses as the memory FSAM and the buffer memory BM;
- N marker memories AM1, . . . ,AMN respectively associated with outputs OU1, . . . ,OUN;
- N request logic circuits RL1, . . . ,RLN respectively associated with the N marker memories AM1, . . . ,AMN;
- an arbitration circuit FFO associated with the memory VIM1;
- a multiplexer MX1, with two inputs, one output, and one command input;
- a circuit FFM1, to manage the free sites of the cell identity memory VIM1 and the address memory FSAM, which also deletes the contents of the sites to be freed.

The first input of the command unit CU1 is linked to a write-data input 'wd' of the memory VIM1. It is furthermore linked to a data input common to all the marker memories AM1, . . . ,AMN. For each cell received by the node, the first input supplies a cell identifier TSTP-OA, consisting of TSTP, which indicates the time period during which the waiting delay will expire, and the identity OA of the output from which this cell must be emitted.

The identifier TSTP-OA is recorded in the waiting cell memory VIM1, at a free site designated by an address FA, supplied by a first output of circuit FFM1 to its address input 'ad'. This address is the same as the one furnished to address memory FSAM for storing the address FSA of the first sub-cell. This particularity will allow to find an address FSA when a site address in memory VIM1 is determined by addressing this memory VIM1 by the content of this site. The identifier TSTP-OA is also used as an address for recording a marker in one of the memories AM1, . . . ,AMN. The identity OA allows to select one of memories AM1, . . . ,AMN, and the identity TSTP allows to select a site in the memory chosen this way. Each of the marker memories contains a number of registers equal to TSTPmax, where each has a capacity of one bit. Each marker consists of a single bit and identifies a time period by the rank position of the register it occupies in one of the marker memories.

Each marker indicates that there is at least one cell whose waiting delay will expire during the time period identified by this marker, and which must be emitted from the output corresponding to the marker memory in question, when the output becomes available. A single marker is common to all cells whose waiting delays will expire during the same time period, for a given output.

The memory VIM1 possesses an input 'ci' called a comparison input, which is linked to a common output of request logic circuits RL1, . . . ,RLN, to receive an identifier TSTP'-OA', called a cell emission identifier, which identifies at least one cell whose waiting delay has expired. The memory VIM1 possesses outputs whose number equals the number of sites it contains. This number is chosen as a function of the N number of node outputs, and the average waiting delay of cells in the buffer memory BM.

Since the memory VIM1 is accessible by its content, its function is as follows: it is possible to store data applied to input 'wd' in a site designated by an address applied to input 'ad'. It is then possible to determine which site contains any given value by applying an identical value to the comparison input 'ci'. Each site containing this value is indicated by a bit at a respective output. The arbitration circuit FFO is a priority encoder, with inputs linked respectively to the outputs of the memory VIM1, and with a first output that supplies a binary word which successively indicates the addresses RA of the memory VIM1 whose content has the desired value, for example by considering the addresses in decreasing order of priority.

The circuit FFO furthermore possesses a second output linked to a second input common to request logic circuits RL1, . . . ,RLN. The second output supplies a logic signal M with a value of 0 when there is no further positive result with the comparisons in memory VIM1, and a value of 1 with at least two positive results. With several positive results, the signal M maintains the value of 1 as long as the addresses have not been supplied to the circuit FMM1. This signal asks the request circuit that has supplied the identifier TSTP-OA' to supply the identifier again each time the output in question has finished emitting a cell, so as to successively emit all the cells corresponding to the same identifier value of the cell to be emitted.

Thus, the arbitration circuit FFO allows to successively treat several cells whose delays expire simultaneously, and which must be emitted from the same output.

Each time an address RA of the memory VIM1 has been determined by the circuit FFO, circuit FMM1 frees this site by writing a zero value identifier to it, which is supplied by a second output of circuit FMM1 to input 'wd' of memory VIM1. Simultaneously, the first output of circuit FMM1 supplies an address to the address input 'ad' of memory VIM1, which is equal to the address RA just determined by the circuit FFO. When an identifier TSTP'-OA' of a cell to be emitted allows to find several identifiers TSTP-OA in the memory VIM1, each of their addresses is then successively determined by circuit FFO, when invoked by the request circuit, and is then freed by the circuit FMM1.

The first output of the arbitration circuit FFO is also linked to a first input of multiplexer MX1. A second input of multiplexer MX1 is linked to the output of the management circuit FMM1. The output of this multiplexer MX1 forms the output of unit CU1 linked to the input of read and write address 'ad' of address memory FSAM.

The multiplexer MX1 has a command input, not illustrated, linked to a not illustrated sequencer. This sequencer supplies command signals and clock signals to the assembly of the resequencing device. The sequence of cell treatment operations, performed under its command, is explained further on.

The input-output of unit CU1 is linked to the bus RQB of output circuits OU1, . . . ,OUN by an interface circuit, not shown, to supply the address FSA' of the first sub-cell of a cell to be emitted to these output circuits.

Each marker memory AM1, . . . ,AMN has one output for each register able to memorize a marker. The number of these outputs is therefore TSTPmax for each memory. Each of the request logic circuits RL1, . . . ,RLN has inputs linked respectively to the outputs of one of the marker memories AM1, . . . ,AMN. Each one furthermore has an input respectively linked by the bus RQB to an output of one of output circuits OL1, . . . ,OLN. Each marker memory AM1, . . . ,AMN has 256 zero reset inputs linked respectively to 256 outputs of the corresponding request circuit RL1, . . . ,RLN by 256 links referenced RZ.

Let us consider in sequence the two large stages of the treatment of a cell by unit CU1: its reception and placement for waiting in the waiting cell memory VIM1; then its search, its recovery, and its emission when the intended output becomes available and the waiting delay has expired.

When a cell has been stored in the buffer memory BM, the header treatment HP simultaneously furnishes to the command unit CU1 the address FSA of the first sub-cell, and the identity TSTP-OA of the cell. This address and this identity are respectively written into the memory FSAM and the memory VIM1, at a same address FA supplied by the circuit FMM1, via the multiplexer MX1, which was ordered to transmit this address FA to the address input 'ad' of memory FSAM. Simultaneously, the identity TSTP-OA is used as an address to select a marker site in one of the memories AM1, . . . ,AMN, and to write the marker therein. The cell then waits at least until its waiting delay has expired.

When an output OU1, . . . ,OUN becomes available, the corresponding output circuit OL1, . . . ,OLN sends a message via bus RQB, addressed to a request logic circuit RL1, . . . , or RLN, which corresponds to the available output. An interface, not illustrated, receives this message and supplies a logic signal IDL to the request circuit in question, indicating that the corresponding output is available. From among the markers corresponding to the output in question, this request circuit determines the oldest marker that corresponds to the cell (or cells) stored for the longest time. It supplies an identifier TSTP'-OA' of a cell to be emitted, which designates at least one cell whose waiting delay has expired and which must be emitted from this available output. This identifier is composed of: a field TSTP', which is a time stamp designating a time period in which the waiting delay has expired; and an output address OA' that designates the available output.

The value of the time stamp TSTP', contained in the identifier of the cell to be emitted, is not linked in a fixed way to the value of the current time stamp TSTP assigned to the cells being received. The value of the field TSTP' is calculated by the request logic circuit as a function of the value of field TSTP' that was previously determined for the output in question. It is further a function of the fact that the arbitration circuit FFO has previously detected either a single cell, or several cells having an identifier that is equal to identifier TSTP'-OA', previously determined for the output in question.

If the memory VIM1 contains a single identifier TSTP-OA that is equal to an identifier TSTP'-OA' of cells to be emitted, the circuit FFO detects a single address supplied by the outputs of memory VIM1. It supplies a signal M with a value of 0 to the request logic circuits, to indicate that there is no search of other cells corresponding to the identifier which these circuits have just supplied. The request circuit that supplied the value TSTP'-OA' concludes that there is only one cell to be emitted. It can therefore go on to another value of identifier TSTP'-OA' during the next period. It can determine a new value of the field TSTP' to form a new value for TSTP's-OA', by searching for the next oldest marker.

If several cells have arrived at the same time at the input of the resequencing device RU, and are intended for the same output, the memory VIM1 then contains the same identifier value TSTP-OA in several sites. It supplies several addresses AD1, AD2, AD3 simultaneously to its outputs. The arbitration circuit FFO detects that a number of addresses exist at its inputs. It then supplies a logic signal M with a value of 1 to the request circuits RL1, . . . ,RLN, indicating there are several cells that correspond to identifier TSTP'-OA'. The request logic circuit then knows it has to supply several times the same identifier TSTP'-OA' value to the comparison input of memory VIM1. Each time, the arbitration circuit FFO supplies a different address RA until all the cells with an identifier TSTP'-OA' have been used up. The signal M then takes on the value of 0. The request circuit can determine a new value for the field TSTP'.

The address RA, supplied by the arbitration circuit FFO, is transmitted by multiplexer MX1 to the input of read and write address 'ad' of memory FSAM, for reading the address FSA' of the first sub-cell of the cell to be emitted. This address FSA' is transmitted by a not shown interface and by the bus RQB to the destination of output circuit OL1, . . . ,OLN having issued the request message IDL. This output circuit then asks the management unit BMMU of buffer memory BM, through the intermediary of bus TDM2, to transmit to it the chain of all sub-cells forming the cell whose first sub-cell is at the address FSA' in the buffer memory BM. When this output circuit has received the last sub-cell of this cell, its output is free again. It then sends a message IDL again, via bus RQB, to its associated request logic circuit.

The address RA is also supplied to the address management circuit FMM1. The content of this address must be deleted from the memory VIM1, to prevent a renewed supply of the same identifier TSTP'-OA' from provoking the determination of the same address RA by the arbitration circuit FFO. The circuit FMM1 transmits the address RA to address input 'ad' of memory VIM1, and a binary word with a value of zero to the write data input 'wd'.

The circuit FMM1 memorizes this available address. It draws from the available addresses to supply an address FA to the memories VIM1 and FSAM, when a cell is received by the resequencing device.

Figure 3:
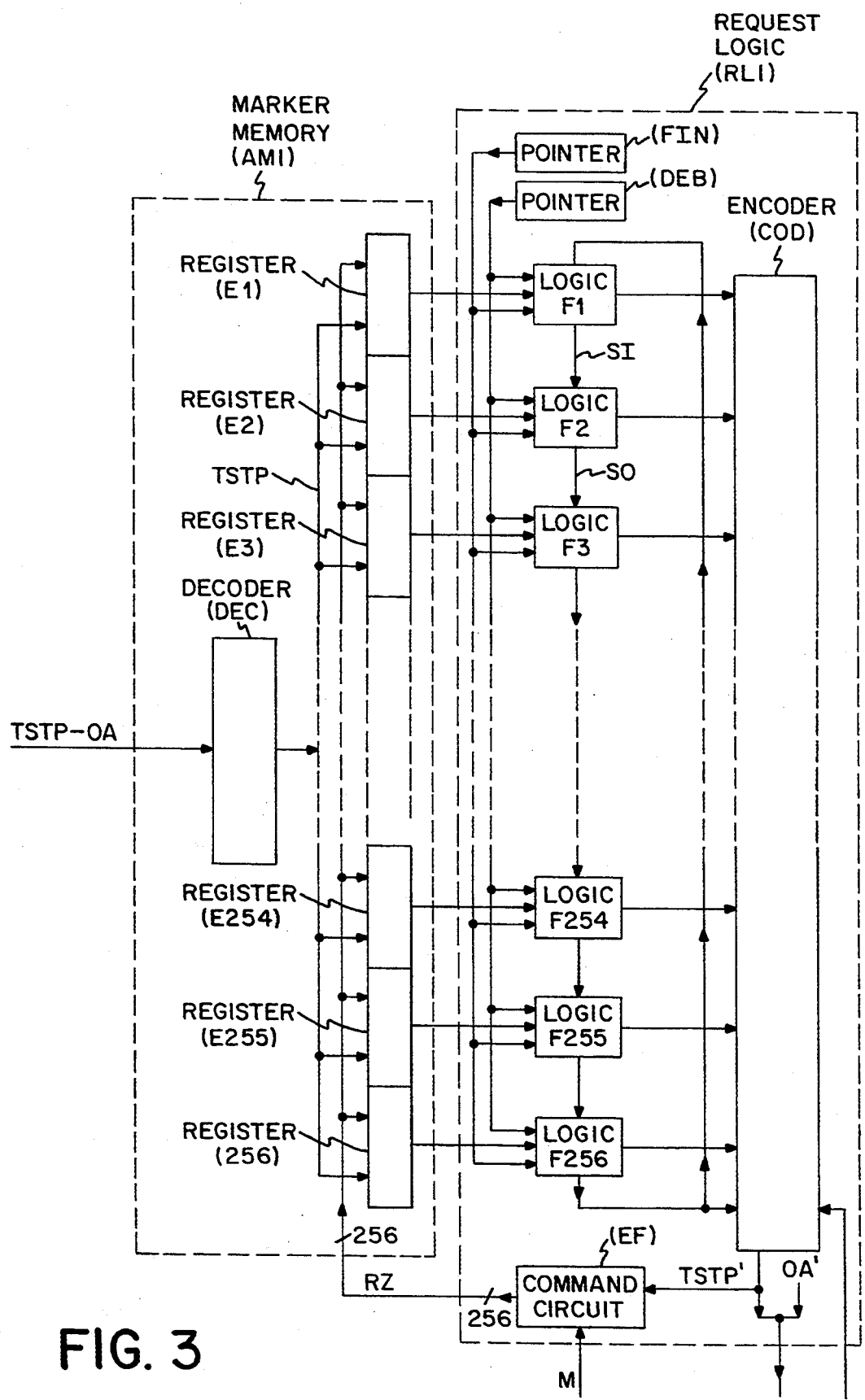
FIG. 3 is the synoptic diagram of a part of the first configuration example.

FIG. 3 schematically depicts a configuration example of the marker memory AM1 and the request logic circuit RL1 associated with output OU1. The other marker memories AM2, . . . ,AMN and the other request circuits RL1, . . . ,RLN are respectively identical. The marker memory AM1 contains: a decoder DEC, and a chain of registers E1, . . . ,E256, with a capacity of one bit each, where the TSTPmax value is assumed to be 256.

The request logic circuit RL1 contains:
256 logic circuits F1, F2, F3, . . . ,F256, which are all identical;
a pointer FIN and a pointer DEB which are incremented with a period equal to the sub-cell period;
an encoder COD which has: 256 data inputs, one validation input that receives the signal IDL supplied by the output circuit OL1 when it is available, and one output;
one command circuit EF, with: one input linked to the output of encoder COD, one input to receive the signal M, and 256 outputs respectively linked to the 256 links RZ.

The output of request circuit RL1 supplies an identifier TSTP'-OA' of a cell to be emitted, whose field TSTP' is formed by a binary word supplied by encoder COD, and whose field OA' is supplied by adequate wiring corresponding to the rank position of the output in question.

The decoder DEC contains an input that forms the input of memory MA1 (sic), which receives the identifier TSTP-OA supplied by the header treatment circuit HP. It has 256 outputs linked to one input each respectively of registers E1, . . . ,E256. The decoder DEC only decodes the TSTP part of this identifier. It is used to address one of the registers E1, . . . ,E256, and to write a value of 1 therein, forming a marker that indicates at least one cell is waiting, which has the time stamp TSTP.

Each of the registers E1, . . . ,E256 has an output that constitutes an output of memory AM1, and which is linked respectively to an input of the request circuit RL1. Each one has a zero reset input linked respectively to an output of the command device EF, by one of the 256 links RZ.

Each of the pointers FIN and DEB consists of a module counter TSTPmax=256, and a decoder to decode the contents of the counter. The pointer FIN has 256 outputs linked respectively to a first command input of each logic circuit F1, ... ,F256. The pointer DEB has 256 outputs linked respectively to a second command input of each logic circuit F1, ... ,F256. A logic circuit F1, ... ,F256 is validated to read the content of the corresponding register E1, ... ,E256, only if it does not simultaneously receive a logic signal with a value of 1 at its first command input, and a logic signal with a value of 1 at its second command input.

The command circuit EF receives the value of the field TSTP' and the value of the signal M, to reset the marker corresponding to this TSTP' value to zero, when the value 0 of the signal M supplied by the circuit FFO indicates that all the cells corresponding to this marker have been found.

The logic circuits F1, ... ,F256 constitute a reading and arbitration circuit. The output of a single one among them supplies a signal with a value of 1, indicating the highest ranking register position among those containing a valid marker. In fact, at a given moment, a distinction must be made between valid markers and markers that are not yet valid because they are assigned to the priority encoder COD. Because of the limited capacity of the memory AM1, the registers are reutilized cyclically. Consequently the most recently received cells can correspond to markers memorized in registers with a lower rank position than that of registers memorizing the markers that correspond to cells received earlier. It is therefore necessary to prevent the reading of these markers in registers that correspond to more recently received cells.

The logic circuits F1, ... ,F256 have the characteristic of being validated or inhibited by the pointers FIN and DEB. The content of the pointer FIN is always lower than the content of pointer DEB, module TSTPmax=256, because the pointer DEB is initialized with the value of zero, while the pointer FIN is initialized with the value of zero when the pointer FIN is initialized with the value of Lo=128 (module 256). The pointers DEB and FIN inhibit all the logic circuits F1, ... ,F256 with a higher rank position than the value indicated by the pointer FIN, and lower or equal to the value indicated by the pointer DEB. All the logic circuits F1, ... ,F256 with a rank at least equal to the value indicated by the pointer DEB, or lower or equal to the value indicated by the pointer FIN, module 256, are validated.

Each of the logic circuits F1, ... ,F256 has an output linked to an input of encoder COD, and a validation output linked to a validation input of the next logic circuit, which is looped to the validation input of circuit F1: the validation output of logic circuit F256 is linked to the validation input of circuit F1, and to an input of encoder COD. The configuration of the logic circuits F1, ... ,F256 is left to the specialist.

One output of encoder COD supplies a binary word that translates the rank value of the unique logic circuit F1, ... ,F256, which supplies the signal with a value of 1, in other words the highest rank among the registers E1, ... ,E256 that belong to the range validated by the pointers FIN and DEB, and which contain a marker.

The fact of delimiting a range in which reading of marker is possible, and a range where it is not possible during a certain period of time, allows to prevent the premature reading of certain markers.

However, this configuration example cannot be used while the number of sub-cells in a cell is greater than TSTPmax, because the 'folding back' of the scanning of registers E1, ... ,E256 leads to a desequencing of cells in certain cases.

Figure 4:
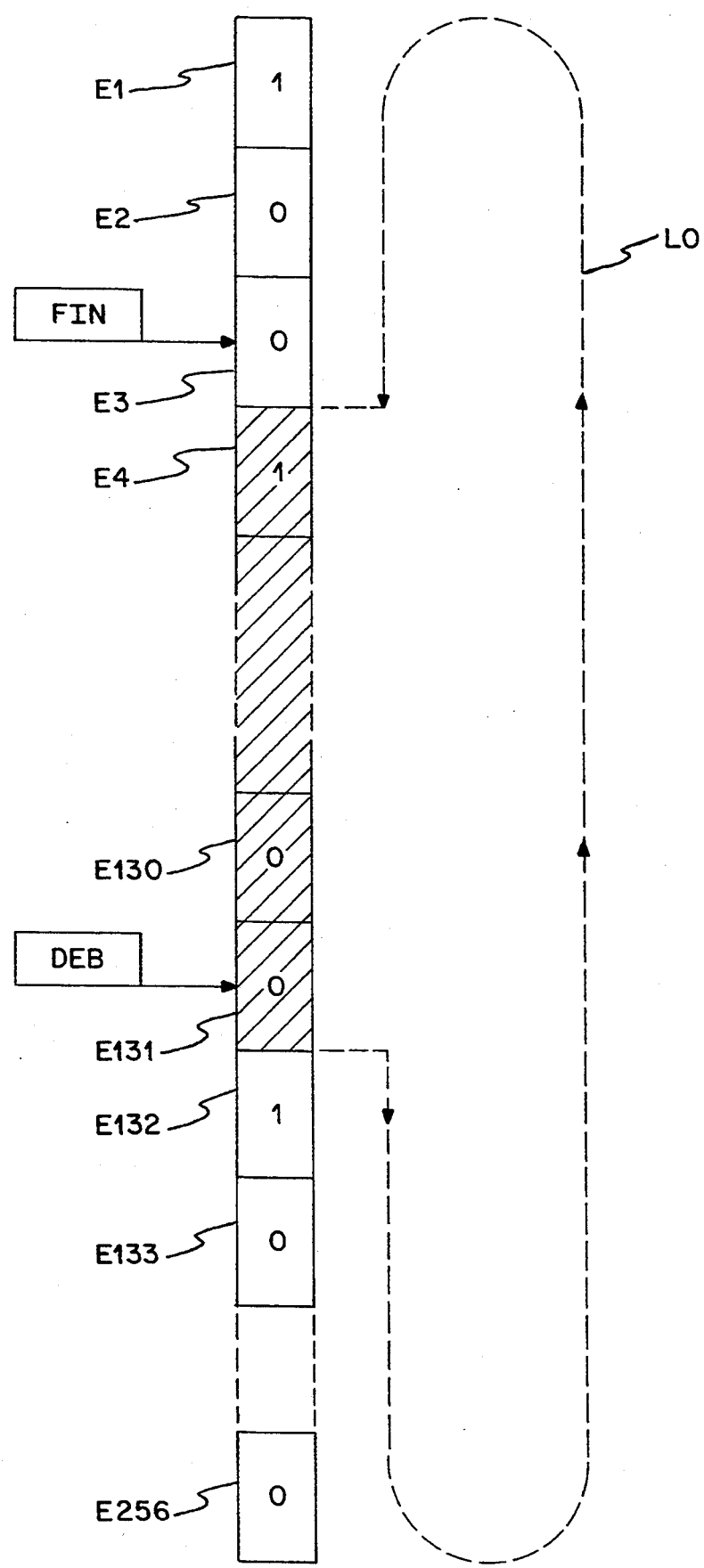
FIG. 4 illustrates the function of that part of the first configuration example.

FIG. 4 illustrates the operation of validating, reading and deleting the markers in registers E1, ... ,E256, when the circuit OL1 indicates it is available by sending the signal IDL to the command circuit EF. The pointer DEB is regularly incremented at each sub-cell period, and supplies a value that is equal to the time stamp TSTP of all the cells whose waiting delay is expiring. In this configuration example, this value is identical to that of the current time stamp TSTP supplied by generator TSG, since the total delay is chosen to be equal to the module TSTPmax of generator TSG. All the time stamps with a value greater or equal to the value of pointer DEB, correspond to cells whose waiting delay has expired, and which are therefore authorized for emission. Because of the cyclic scanning of the values 0 to TSTPmax, the values between 0 and the value of pointer FIN must also be considered.

In this example, the pointers FIN and DEB validate the logic circuits F132, ... ,F256, F1, F2, F3. Logic circuits F1 to F256 can only read the contents of registers E1, E2, E3, E132, ... ,E256, not hatched in FIG. 4. In this reading range, they can detect a marker in register E132 and a marker in register E1, for example. They determine that the marker with the highest rank position is the one contained in register 132. The encoder COD then supplies a time stamp TSTP', which is 132 in this example.

The events that take place during the following periods depend on the content of the memory VIM1.

If only one cell is waiting, with a time stamp TSTP of 132 and intended for output OU1, the logic signal M keeps the value of 0. From this, the command circuit EF deduces that it can immediately delete the marker in register 132.

If several cells are waiting, with time stamps TSTP of 132 and intended for output OU1, the logic signal M has a value of 1. The circuit EF knows that it must then wait before deleting the next marker. Encoder COD then supplies the value TSTP'=132, until the return to 0 of the logic signal M indicates to the command circuit EF that all the cells that can be found in the memory VIM1, have been found. From this the command circuit EF deduces that it can delete the marker in register E132.

It can be shown that, to prevent resequencing errors, the length Lo of the range where the markers can be validly read must be lower or equal to:

TSTPmax−Dmax+Dmin, where Dmax is the maximum duration of transit in the switching network, and where Dmin is the minimum duration of transit. The difference TSTPmax−Lo between the initialization values of pointers DEB and FIN must therefore be lower than Dmax−Dmin.

Figure 5:
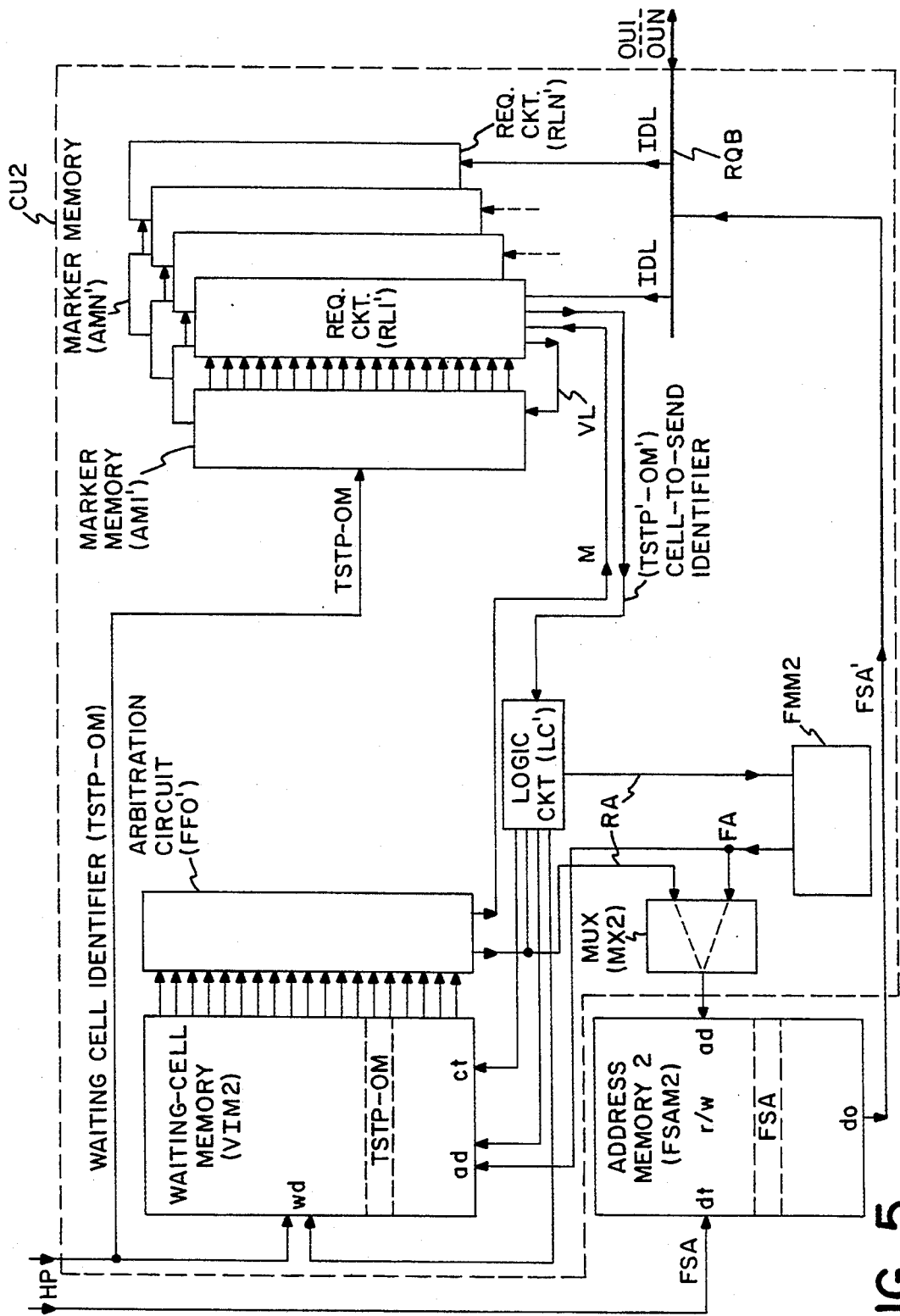
FIG. 5 represents a synoptic diagram of a part of the second configuration example, which permits distribution from one input to several outputs.

FIG. 5 depicts the synoptic diagram of the command unit CU2 of a second configuration example of the device according to the invention, which permits distributing a cell to several outputs of the node. The unique output address OA is replaced by a binary word 0M containing a number of bits equal to the number N of outputs. A waiting cell memory VIM2 replaces VIM1 and stores identifiers TSTP-OM instead of identifiers TSTP-OA. This memory is accessible for reading in two ways: either by the content, like memory VIM1, or by an address applied to the input 'ad'.

The request logic circuits RL1', ... ,RLN' supply identifiers of cells to he emitted, TSTP'-OM', in which TSTP' is still a time stamp value designating at least one cell whose delay has expired, and where OM' is a word of N bits among which a single hit has the value of 1. The rank position of this hit designates a unique output that is available.

The memory VIM2 has a comparison input 'ci' but it operates a little differently than memory VIM1 described earlier with reference to FIG. 2, because the comparison must extend to the field TSTP' and to the only non-zero hit in OM'. The N−1 other bits in OM' and the corresponding N−1 other bits in the field OM of the memorized identifiers TSTP-OM, must not he compared. The bits of the field OM in each word TSTP-OM must he masked by the bits of field OM' of TSTP'-OM' before the comparison is made between the identifier TSTP'-OM' and each waiting cell identifier TSTP-OM, stored in memory VIM2.

This second configuration example further contains:
a multiplexer MX2 analogous to MX1;
an arbitration circuit FFO' analogous to FFO;
N marker memories AM1', ... ,AMN' analogous to AM1, ... ,AMN;
N arbitration circuits RL1', ... ,RLN' analogous to RL1, ... ,RLN;
an available address management circuit FMM2 to replace circuit FMM1;
a logic circuit LC'.

The direct link LC of circuit CU1 is replaced by a logic circuit LC', added to reset to zero a bit in the field OM in each identifier TSTP-OM, which is detected by the comparison, in order to store the fact that an output has been served, in memory VIM2. The circuit LC' contains: one input linked to a common output of the request logic circuits RL1', ... ,RLN', to receive the identifier TSTP'-OM' of cells to be found; one input linked to the output of arbitration circuit FFO, which supplies the address RA to an identifier found in the memory VIM2; one output for retransmitting this address RA to the management circuit FMM2, when this address is free; one output linked to the data input 'wd' of memory VIM2; and one output linked to the comparison input 'ci' of memory VIM2.

For example, if the resequencing device has 8 outputs, and if the fourth output is available to emit a cell whose delay has expired during a time period TSTP1, the request logic circuit RL1' of this output supplies the identifier TSTP1-00001000 to the memory VIM2, via logic circuit LC'.

For example let's suppose that memory VIM2 contains at least one waiting cell identifier equal to TSTP1-00001100. This identifier announces that there is a waiting cell whose waiting delay has expired, and which must be emitted from the third and the fourth output.

A first comparison search by TSTP1-00001100 causes the memory VIM2 and the circuit FFO' to supply the address RA of this waiting cell identifier.

The cells corresponding to this address RA is emitted from the fourth output. The circuit LC' memorizes this fact by linking identifier TSTP-00001100 to the address RA in memory VIM2, then rewriting it in the modified form: TSTP1-00000100 to the address RA in memory VIM2. This modified identifier indicates that the third output remains to be served.

Later, when the third output indicates that it is available, the corresponding request circuit RL3' supplies to the memory VIM2, via logic circuit LC', an identifier TSTP1-00000100 of a cell to be emitted. A second comparison search with this identifier causes the memory VIM2 and the circuit FFO' to again supply the address RA, which contains the modified identifier TSTP1-00000100.

The corresponding cell is emitted from the third output. Circuit LC' memorizes this fact in the following manner: first, it obtains the identifier TSTP1-00000100 by linking it to the address RA in memory VIM2, then it rewrites it in the modified form TSTP1-00000000 to the address RA, which indicates that all destination outputs have been serviced and that no further positive result can be obtained with a subsequent search. The site can be used again. Circuit LC' then transmits the address RA to the free sites management circuit FMM2.

The arbitration circuit FFO' supplies a logic signal M by playing the same role as in circuit CU1. If the memory VIM2 contains several identifiers, whose field TSTP has a value that is equal to the value of field TSTP' of the identifier of the cell to be emitted, and whose field OM has a value of 1 for the bit corresponding to the bit with a value of 1 in the field OM', the signal M takes on the value of 1 to indicate to the requesting circuit that there are at least two cells to be emitted from the corresponding output, and the requesting circuit repeatedly sends the same cell identifier to be found, until the signal M returns to the value of zero.

The extent of the invention is not limited to the configuration examples described above. It is left to the specialist to modify these configuration examples in order to assign a label to each cell leaving the network, whose value is an estimate of the delay undergone by the cell during its transit through the network, instead of assigning it a label when it enters the network, indicating the instant it leaves; then, to have each cell undergo an additional delay of the same duration as the difference between the predetermined value of the total delay, and the estimated value of the transit delay through the network.

Thus, a variation of the configuration consists in assigning a time stamp TSTP to each cell leaving the network SN, instead of assigning it when it enters the network SN. In that case, the time stamp generator TSG is different. It still contains a clock that defines constant time periods which are equal to one sub-cell period; and a module TSTPmax counter. But it further contains; known means to estimate the transit time of each cell through the network SN; means to subtract this estimate from the content of the counter; and means to add to the result the total delay that each cell must undergo. The result of this calculation is the value of the TSTP label indicating the time period during which the waiting delay of the cell expires. It can be used exactly like the value of the TSTP label assigned when it enters the network SN.

The time unit is preferably chosen to be equal to the sub-cell period, because the duration of each cell is at least equal to one sub-cell period, but it is possible to use a smaller time unit.

We claim:
1. Resequencing device (RU) for a node of a cell switching system, each cell comprising a variable number of sub-cells of fixed length, said node comprising a switching network (SW) transmitting said cells with first variable delays, all the sub-cells of a same cell being subjected to a same first delay; said resequencing device (RU) including means for storing all the cells that have been transmitted through said switching network and for then sending them to at least one output of said resequencing device after various waiting delays constituting second delays having expired so that for each cell the sum of said first and said second delay is equal to a predetermined value substantially equal for all said cells; said means including:

a buffer memory (BM) for storing the sub-cells of each cell received by said resequencing device;

an address memory (FSAM) for storing the address (FSA) of said buffer memory containing the first sub-cell of each cell;

means (TSG, IC1, ..., ICN, CU1) for finding in said address memory the address (FSA′) of said buffer memory containing the first sub-cell of a cell when the waiting delay of the cell has expired and when an output which has to send said cell is available;

characterized in that said means for finding the address (FSA′) of said buffer memory containing the first sub-cell of a cell when the waiting delay has expired includes:

a waiting-cell memory (VIM1), addressable by its content, for storing a waiting-cell identifier (TSTP-OA; TSTP-OM) when a cell is stored in said buffer memory (BM); said identifier being stored at an address (FA) identical to the address where the address (FSA) of said first sub-cell is stored in said address memory (FSAM); and said identifier including: the identity (TSTP) of a time slot during which the waiting delay of said cell will expire and the identity (OA; OM) of at least one output to which said cell has to be sent;

marker memories (AM1, ..., AMN) respectively associated with said outputs of said node and means (DEC) for writing therein a marker when a cell is stored in said buffer memory (BM), each stored marker identifying a time slot during which the waiting delay of at least one cell intended to the output associated with said marker memory will expire;

means (RL1, ..., RLN, LC), respectively associated with said marker memories, for reading and deleting a marker corresponding to the oldest time slot among the markers corresponding to waiting delays having expired when the corresponding output is available; and to provide a cell-to-send identifier (TSTP′-OA′; TSTP′-OM′) constituted by the identity (TSTP′) of the time slot and by the identity (OA′; OM′) of the output corresponding to said read marker;

means (LC; LC′) for applying said cell-to-send identifier (TSTP′-OA′; TSTP′-OM′) to a comparison input of said waiting-cell memory (VIM), said memory then providing the addresses (AD1, AD2, AD3) of all the waiting-cell identifiers (TSTP-OA′; TSTP-OM′) corresponding to said cell-to-send identifier; and for freeing the locations of said memory (VIM) corresponding to the cells which have no longer to be sent;

means (FFO, MX) for successively applying to an address input of said address memory (FSAM) of first sub-cells, each address (AD1, AD2, AD3) provided by said waiting-cell memory (VIM) and for reading therein an address (FSA′) of a first sub-cell.

2. Device according to claim 1, characterized in that said marker memories (AM1, ..., AMN) include, for each output, a chain of registers (E1, ..., E256); each register being able to store a single marker and the number of registers being equal to the number (TSTPmax) of identities (TSTP, TSTP′) usable to identify time slots;

in that the means for writing a marker include a means (DEC) for write-enabling the register corresponding to the time slot during which the waiting delay of a cell will expire in function of the identifier (TSTP-OA) of said cell;

in that said means (RL1, ..., RLN) for reading and deleting a marker comprise, for each output:

means (F1, ..., F256, DEB, FIN, EF) for reading the markers corresponding to the oldest time slots;

means (COD) connected to all said registers for providing a cell-to-send identifier (TSTP′-OA′; TSTP′-OM′) comprising: the identity (TSTP′) of the oldest time slot among those corresponding to the read markers and the identity (OA′; OM′) of said output;

means (EF) for deleting the marker corresponding to the oldest time slot among the read markers when all the cells corresponding to said cell-to-send identifier have been found in said waiting-cell memory (VIM).

3. Device according to claim 1, allowing the distribution of one cell from one input to several outputs of said resequencing device, characterized in that:

for each cell to be sent by several outputs, a waiting-cell identifier (TSTP-OM) identifies each of said outputs (OM) on which it has to be sent;

each cell-to-send identifier (TSTP′-OM′) identifies a single available output (OM′);

and in that it also includes means (LC′) for:

successively finding each waiting-cell identifier in said waiting-cell memory (VIM2) containing the identity of said available output identified by said cell-to-send identifier (TSTP′-OM′);

reading each waiting-cell identifier thus found in said memory (VIM2);

sending the corresponding cell to said output;

rewriting said identifier to the same address in said waiting-cell memory (VIM2) after having deleted in said identifier the identity of the output where said cell-to-send was sent, in order to update said waiting-cell identifier (TSTP-OM).

* * * * *